(12) United States Patent
Yeganeh et al.

(10) Patent No.: US 12,203,027 B2
(45) Date of Patent: Jan. 21, 2025

(54) FROZEN MATERIAL FORMATION PREVENTION SYSTEMS

(71) Applicant: ExxonMobil Technology and Engineering Company, Annadale, NJ (US)

(72) Inventors: Mohsen S. Yeganeh, Newtown, PA (US); Robert J. Colby, Annandale, NJ (US); Mark A. King, Maplewood, NJ (US); Abhimanyu O. Patil, Westfield, NJ (US); Satish Bodige, Wayne, NJ (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 303 days.

(21) Appl. No.: 17/596,698

(22) PCT Filed: Aug. 26, 2020

(86) PCT No.: PCT/US2020/047948
§ 371 (c)(1),
(2) Date: Dec. 16, 2021

(87) PCT Pub. No.: WO2021/045945
PCT Pub. Date: Mar. 11, 2021

(65) Prior Publication Data
US 2022/0340798 A1   Oct. 27, 2022

Related U.S. Application Data

(60) Provisional application No. 62/896,748, filed on Sep. 6, 2019.

(51) Int. Cl.
*C09K 3/18* (2006.01)
*B05D 5/08* (2006.01)
*B05D 7/22* (2006.01)

(52) U.S. Cl.
CPC ............... *C09K 3/18* (2013.01); *B05D 5/08* (2013.01); *B05D 7/225* (2013.01)

(58) Field of Classification Search
CPC . B60T 17/006; E03B 7/10; E03B 7/12; E03B 7/14
(Continued)

(56) References Cited

U.S. PATENT DOCUMENTS 4,585,571 A    4/1986 Bloom
4,804,013 A *  2/1989 Wilson ................ B60T 17/006
                                               303/1

(Continued)

OTHER PUBLICATIONS

The International Search Report and Written Opinion for PCT/US2020/047948 mailed Nov. 24, 2020.
(Continued)

*Primary Examiner* — Patrick F Brinson
(74) *Attorney, Agent, or Firm* — C. Tumey Law Group PLLC

(57) ABSTRACT

A frozen material prevention system for preventing a freezable material in a fluid flow from freezing and accumulating frozen material in a flow path, including, a surface configured to interact with a freezable-material-miscible (FMM) liquid to retain the FMM liquid to the surface. The system can include the FMM liquid. The FMM liquid can be configured to absorb the freezable material to prevent freezing and accumulation of frozen material on the surface.

9 Claims, 13 Drawing Sheets

(58) Field of Classification Search
USPC .............................................. 138/26, 32, 34
See application file for complete search history.

(56) References Cited

U.S. PATENT DOCUMENTS

| | | | | |
|---|---|---|---|---|
| 6,231,313 | B1* | 5/2001 | Heitmann | B01F 27/272 |
| | | | | 417/55 |
| 6,237,620 | B1* | 5/2001 | Ferguson | E03B 7/12 |
| | | | | 137/240 |
| 6,623,657 | B1 | 9/2003 | Berglund et al. | |
| 8,499,797 | B1* | 8/2013 | Caine | B60T 17/043 |
| | | | | 138/34 |
| 9,506,604 | B2* | 11/2016 | Allen | F17D 1/00 |
| 2009/0095367 | A1* | 4/2009 | Socha | B60T 17/043 |
| | | | | 138/34 |

OTHER PUBLICATIONS

Kim et al., "Liquid-Infused Nanostructed Surfaces with Extreme Anti-Ice and Anti-Frost Performance", ACS Nano, vol. 6, No. 8, (2012), pp. 6569-6577.

* cited by examiner g: 3rd heating cycle

FROZEN MATERIAL FORMATION PREVENTION SYSTEMS

CROSS-REFERENCE TO RELATED APPLICATIONS

This application is a national stage application under 35 USC 371 of International Application No. PCT/US2020/047948, filed on Aug. 26, 2020, which claimed the benefit of U.S. Provisional Patent Application No. 62/896,748 filed Sep. 6, 2019.

FIELD OF THE INVENTION

This disclosure relates to fluid flow systems, more specifically to frozen material formation prevention systems.

BACKGROUND OF THE INVENTION

Removal of water from hydrocarbon gas streams is an important step in various processes including natural gas (NG) to liquid natural gas (LNG) conversion. A cryogenic approach of the removal step is a cost effective option but hardly practiced due to the plugging of heat exchangers and tubes with frozen materials. Using surfaces that resist against ice formation at a very low temperatures can make the water removal step possible.

To reduce water ice formation on surfaces, the surfaces can be impregnated with a water-immiscible hydrophobic liquid. This approach takes advantage of the high contact angle of water on the immiscible liquid, increasing the nucleation energy barrier. This method can help prevent ice and frost formation on surfaces down to negative 10° C. Although this is a significant improvement over previous technology, it may not be useful for deep hydrocarbon stream dehydration needed for the NG to LNG process and the cryogenic removal of CO2 that require temperature well below negative 60° C.

Such conventional methods and systems have generally been considered satisfactory for their intended purpose. However, there is still a need in the art for improved frozen material formation prevention systems. The present disclosure provides a solution for this need.

SUMMARY OF THE INVENTION

A frozen material prevention system for preventing a freezable material in a fluid flow from freezing and accumulating frozen material in a flow path can include a surface configured to interact with a freezable-material-miscible (FMM) liquid to retain the FMM liquid to the surface. The system can include the FMM liquid. The FMM liquid can be configured to absorb the freezable material to prevent freezing and accumulation of frozen material on the surface.

The freezable material can be or can include water. Therefore, the frozen material can be or can include water ice. In certain embodiments (e.g., where the freezable material is or includes water), the FMM liquid can be or can include propylene glycol.

In certain embodiments, the surface can form at least a portion of a flow structure that defines the flow path. For example, the surface can include a tubular shape.

In certain embodiments, the system can include a regeneration system connected to surface. The regeneration system can be configured to at least partially remove freezable material from the FMM liquid to at least partially regenerate the FMM liquid on the surface.

The regeneration system can include a regeneration unit in fluid communication with the surface by an inlet line connected to an inlet at the surface and an outlet line connected to an outlet at the surface to circulate the FMM liquid. The regeneration unit can be a water removal system configured to remove water from the FMM liquid.

In certain embodiments, the outlet can be downstream from the inlet relative to a direction of the fluid flow in the flow path. Any suitable location for the outlet and inlet is contemplated herein.

In accordance with at least one aspect of this disclosure, a liquid impregnated surface (LIS) can include a surface, e.g., as described above, configured to interact with an FMM liquid to retain the FMM liquid to the surface, and the FMM liquid, e.g., as described above, disposed on the surface. In certain embodiments, the surface can form a flow structure defining a flow path. Any other suitable shape or application of the LIS is contemplated herein.

In accordance with at least one aspect of this disclosure, a method can include absorbing a freezable material from a fluid flow using a freezable-material-miscible (FMM) liquid disposed on a surface defining a flow structure, thereby forming mixed FMM liquid having at least some freezable material therein, flowing at least a portion of the mixed FMM liquid from the surface to a regeneration unit, removing at least a portion of the freezable material from the mixed FMM liquid to form at least partially regenerated FMM liquid, and returning the at least partially regenerated FMM liquid to the surface. The method can include any other method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 6A-6H show images of a comparison test between a reference aluminum plate (left), a hydrophobic liquid infused surface (middle), and a hydrophilic liquid infused surface (right) at various stages, wherein FIG. 6A shows a starting point, FIG. 6B shows a first cooling cycle, FIG. 6C shows a first heating cycle, FIG. 6D shows a second cooling cycle, FIG. 6E shows a second heating cycle, FIG. 6F shows a third cooling cycle, FIG. 6G shows a third heating cycle, and FIG. 6H shows a further cooling cycle.

DETAILED DESCRIPTION OF THE INVENTION

Figure 1:
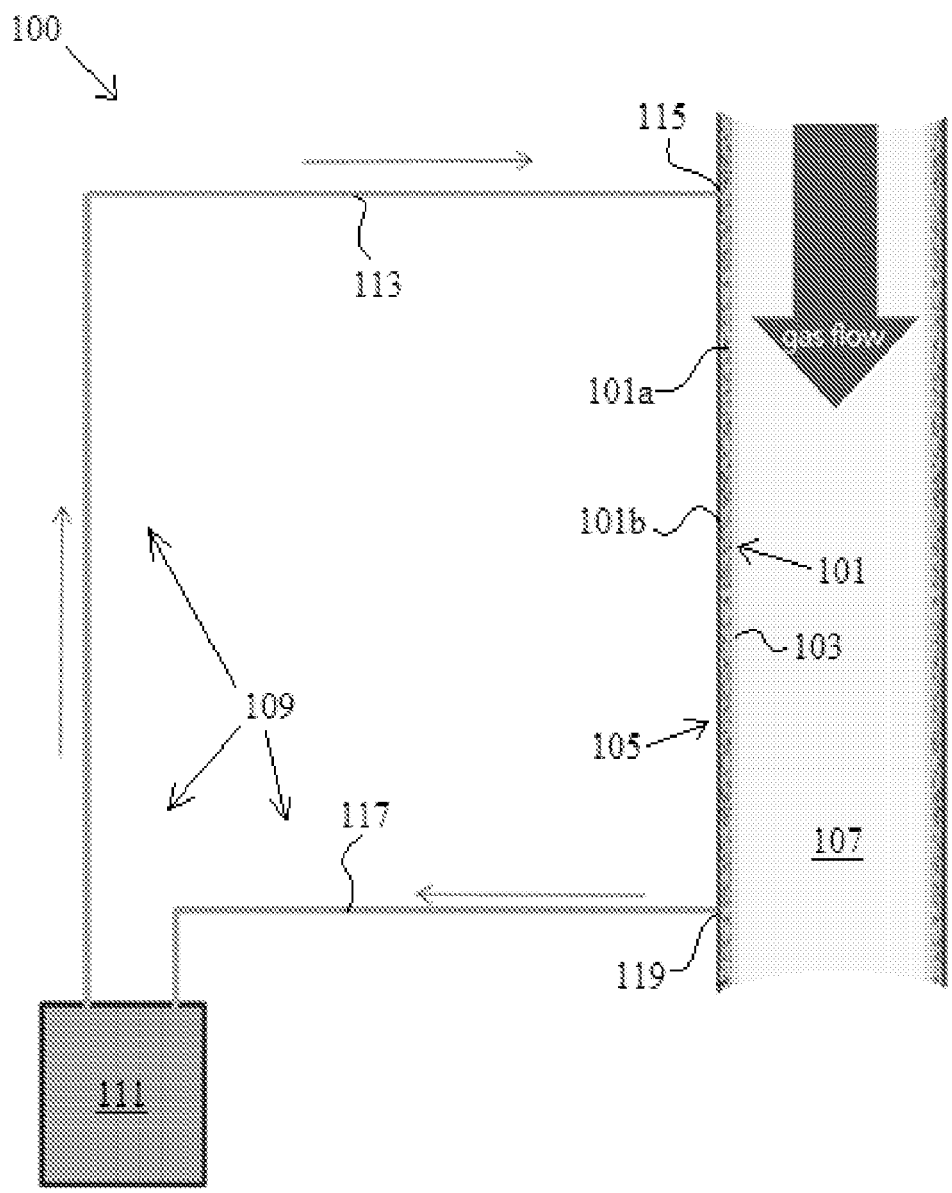
FIG. 1 is a schematic cross-sectional view of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-7. Certain embodiments described herein can be used to provide anti-icing and/or deicing surfaces (e.g., for natural gas to liquid natural gas conversion, cryogenic removal of CO2, wind turbine structures, and aircraft structures).

Figure 2:
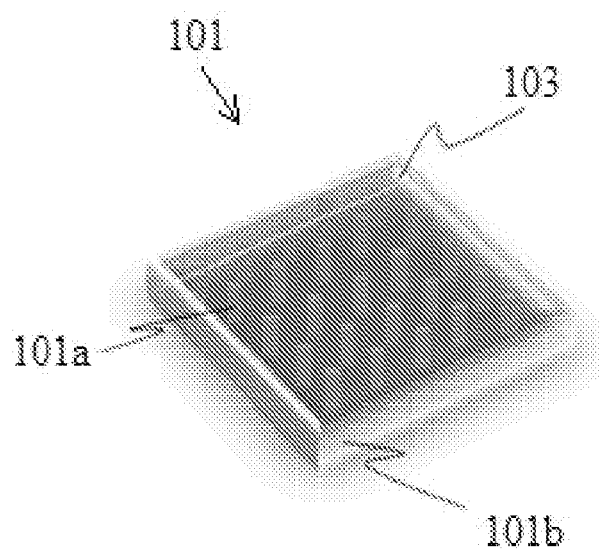
FIG. 2 is a partial perspective view of a liquid impregnated surface (LIS) in accordance with this disclosure.

Referring to FIGS. 1 and 2, a frozen material prevention system 100 for preventing a freezable material (e.g., water vapor or liquid particulate) in a fluid flow from freezing and accumulating frozen material in a flow path (e.g., 107) can include a surface 101 configured to interact with a freezable-material-miscible (FMM) liquid to retain the FMM liquid to the surface 101. As shown in FIG. 2, the surface 101 can include one or more surface features 101a and/or roughness and a solid substrate 101b. In certain embodiments, the surface 101 can be made of a selected material or to be chemically functionalized to chemically interact with the FMM liquid 103.

The system 100 can include the FMM liquid 103 disposed on the surface 101, e.g., as shown in FIGS. 1 and 2. The FMM liquid 103 can be configured to absorb the freezable material to prevent freezing and accumulation of frozen material on the surface 101.

The freezable material can be or can include water (e.g., in the form of water vapor). Therefore, the frozen material can be or can include water ice. Any other suitable freezable material is contemplated herein.

In certain embodiments (e.g., where the freezable material is or includes water), the FMM liquid can be or can include propylene glycol. Any other suitable water miscible compound is contemplated herein, e.g., ionic liquid Low Transition Temperature Mixtures of choline chloride and ethylene glycol (LTTM). Any other suitable compound miscible with a desired freezable material or materials is contemplated herein.

In certain embodiments, the surface 101 can form at least a portion of a flow structure 105 that defines a flow path 107, e.g., as shown in FIG. 1. For example, the surface 101 can include a tubular shape, e.g., as shown. Any other suitable shape is contemplated herein.

In certain embodiments, the system 100 can include a regeneration system 109 operatively connected to surface 100. The regeneration system 109 can be configured to at least partially remove the freezable material from the FMM liquid 103 to at least partially regenerate the FMM liquid 103 on the surface 101.

The regeneration system 109 can include a regeneration unit 111 in fluid communication with the surface 101 by an inlet line 113 connected to an inlet 115 at the surface 101 and an outlet line 117 connected to an outlet 119 at the surface 101 to circulate the FMM liquid 103. The regeneration unit 111 can be a water removal system configured to remove water from the FMM liquid 103. Any suitable system that separates water from a fluid as appreciated by those having ordinary skill in the art is contemplated herein. The regeneration unit 111 can be configured to remove any freezable material the system is designed to capture in the FMM liquid 103, and can include any suitable system configured to do so (e.g., a selectively permeable membrane system, a boiler type system).

In certain embodiments, the outlet 119 can be downstream from the inlet 115 relative to a direction of the fluid flow 121 in the flow path 107. Any suitable location for the outlet 119 and inlet 115 is contemplated herein (e.g., the inlet 115 being downstream of the outlet 119).

In accordance with at least one aspect of this disclosure, a liquid impregnated surface (LIS) can include a surface, e.g., 101 as described above, configured to interact with an FMM liquid to retain the FMM liquid to the surface, and the FMM liquid, e.g., 103 as described above, disposed on the surface. In certain embodiments, the surface can form a flow structure defining a flow path. Any suitable shape or application of the LIS is contemplated herein (e.g., in one or more flow paths of a natural gas (NG) to liquid natural gas (LNG) conversion system, in cryogenic removal of CO2, on wind turbine structures, and aircraft structures).

In accordance with at least one aspect of this disclosure, a method can include absorbing a freezable material from a fluid flow using a freezable-material-miscible (FMM) liquid disposed on a surface defining a flow structure, thereby forming mixed FMM liquid having at least some freezable material therein, flowing at least a portion of the mixed FMM liquid from the surface to a regeneration unit, removing at least a portion of the freezable material from the mixed FMM liquid to form at least partially regenerated FMM liquid, and returning the at least partially regenerated FMM liquid to the surface. The method can include any other method(s) and/or portion(s) thereof.

As appreciated in view of the above, instead of rejecting a freezable material, e.g., water, embodiments are configured to absorb it and remove from a fluid flow continuously. Such surface can be used as anti-icing surfaces that can have a significant impact on energy savings in many operations in the oil/gas industry, for example. Recent efforts for developing ice-repellent materials may use a liquid-impregnated surfaces (LIS), where a water-immiscible liquid over layer is maintained by holding the liquid onto a chemically modified micro-textured or nano-textured surface. An appropriate surface chemical functionalization can make the liquid spread over the solid surface within the texture, for example. Capillary forces provided by the texture and the surface chemical modification can hold the liquid on the surface.

Traditional systems for preventing water ice buildup use a hydrophobic water-immiscible liquid with a high water contact angle to impregnate a chemically modified textured or roughened aluminum surface. A water-immiscible liquid substrate with a high water contact angle increases the nucleation energy barrier, providing an ice-resistant surface. Such ice-phobic aluminum surfaces are able to suppress ice/frost accretion down to negative 10 degrees C., for example. Thus, although this approach may be beneficial for some applications, it is not sufficient, for example, in the NG to LNG process or a cryogenic removal of CO2 from a gas stream where surfaces with anti-ice properties well below negative 60 degrees C. are required.

Embodiments disclosed hereinabove suppress ice formation temperature to well below negative 70 degrees C. Certain embodiments can utilize a low-melting point liquid that is miscible with water, such as propylene glycol or ionic liquid LTTM. Due to the water-miscibility property of the liquid, any ice nuclei on the surface can be dissolved in the liquid before it can grow, for example. Certain embodiments also allow for regeneration of the liquid for re-use and for a continuum operation. The principle underlying embodiments of this disclosure is opposite of traditional anti-icing surfaces, for example.

Experimental Embodiments and Data

Figure 3A:
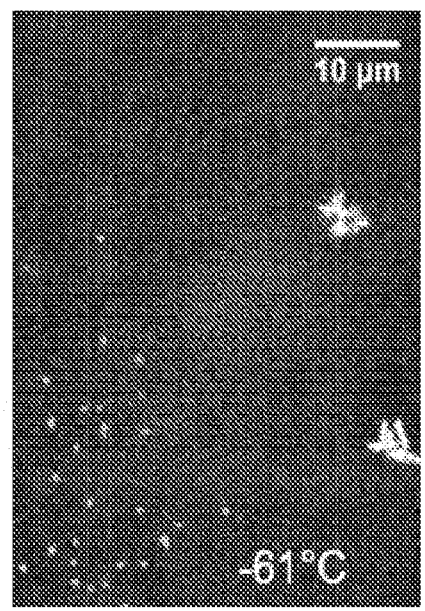
FIGS. 3A and 3B show images of a study of ice formation on a hydrophobic liquid surface at negative 61 degrees C. and negative 100 degrees C., respectively.
Figure 3B:
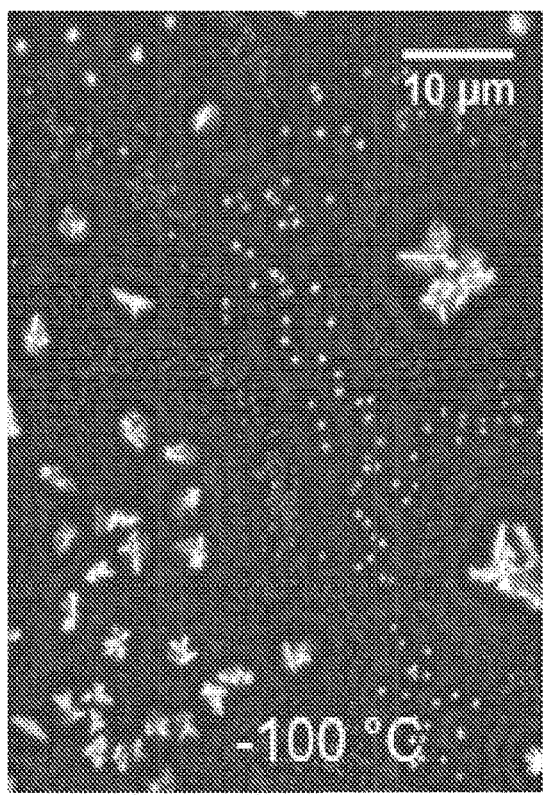

Referring to FIGS. 3A and 3B, ice formation on a hydrophobic liquid surface (Krytox™ fluorinated synthetic oil) was studied. A circular liquid sample holder with base diameter of 1.087 cm and height of 400 microns was filed with Krytox™ GPL104. The base of the liquid sample holder was made of glass and the rest of the holder was constructed from copper. The sample holder filed with Krytox™ was left on the cryo-stage and the sample was kept under nitrogen with a water concentration of 200 ppm. Under N2 flow, the temperature of the stage was brought down to negative 20 degrees C. at the rate of 10 degrees C./min. The sample temperature was then continuously dropped down at the rate of 5 degrees C./min to negative 100 degrees C. under N2 flow while a microscope at magnification of 10× and equipped with a camera was monitoring ice formation on the surface of the liquid.

Ice formation was observed at negative 61° C. on liquid Krytox™ GPL104, as shown in FIG. 3A. Ice formation was observed to progress and become more severe at negative 100° C., as shown in FIG. 3B.

Figure 4A:
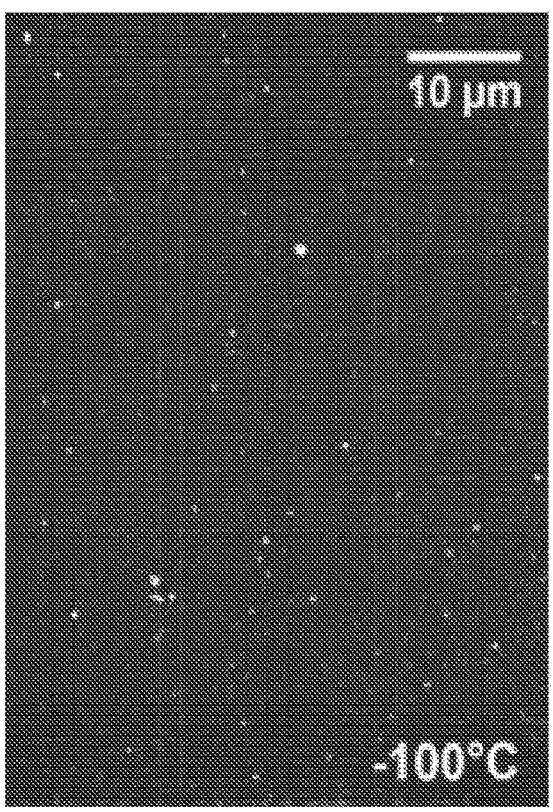
FIGS. 4A and 4B show images of a study of ice formation on a hydrophilic liquid surface at negative 100 degrees C. and negative 110 degrees C., respectively.
Figure 4B:
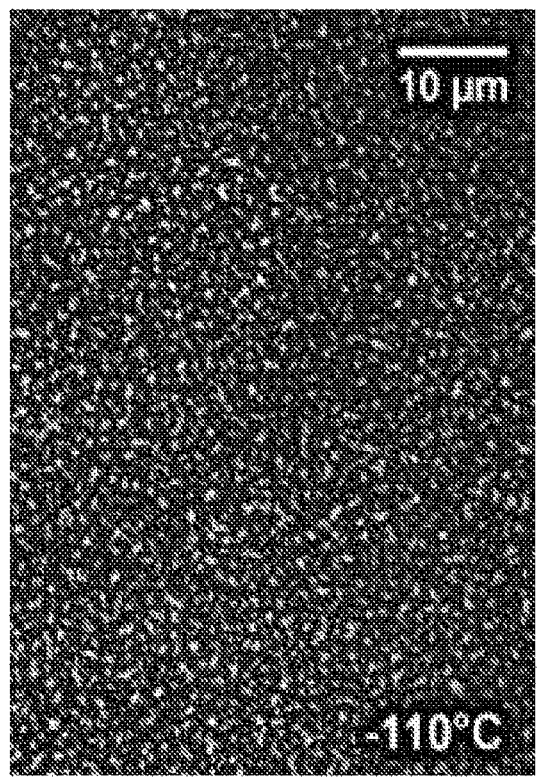

Referring to FIGS. 4A and 4B, ice formation on propylene glycol was then studied. The liquid sample holder described above was filed with propylene glycol. The sample holder filed with propylene glycol was then left on the cryo-stage and the sample was kept under nitrogen flow. Under N2 flow, the temperature of the stage was brought down to negative 20 degrees C. at the rate of 10 degrees C./min. The sample temperature was then continuously dropped down to negative 100 degrees C. at the rate of 5 degrees C./min under N2 flow with water concentration of 200 ppm while a microscope at magnification of 10× equipped with a camera was monitoring ice formation on the surface of the liquid.

FIGS. 4A and 4B show the images of the surface of propylene glycol at negative 100 degrees C. and negative 110 degrees C., respectively. No ice was formed on propylene glycol down to negative 100 degrees C., as shown in FIG. 4A. However, at negative 110 degrees C. the bulk of propylene glycol itself started to freeze, as shown in FIG. 4B. Given that the melting temperature of propylene glycol is negative 59 degrees C., the above example indicates that liquid can be super-cooled to a much lower temperature.

Figure 5:
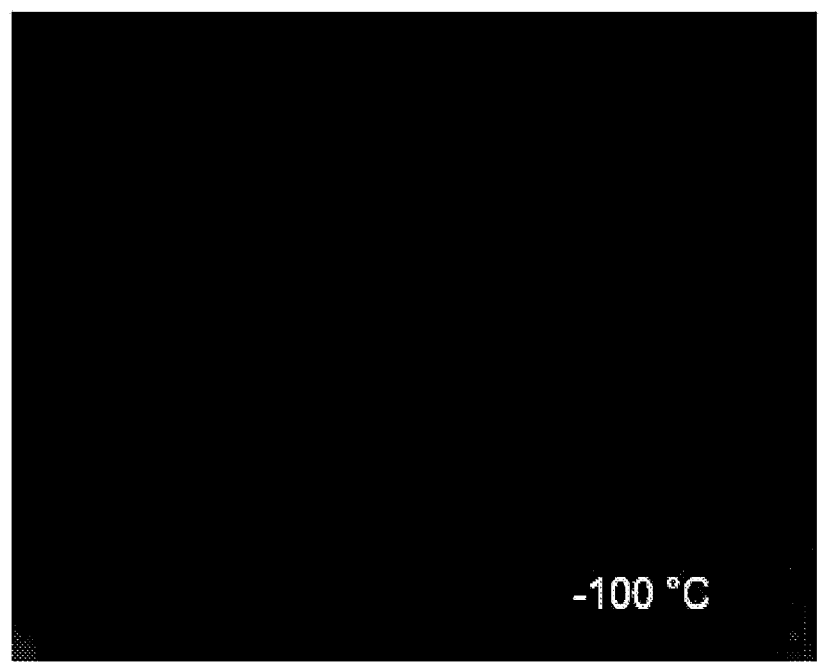
FIG. 5 shows an image of a study of ice formation on another hydrophilic liquid surface at negative 100 degrees C.

Referring to FIG. 5, ice formation on LTTM ionic liquid was studied. The freezing point of LTTM was determined to be negative 117.9 degrees C., as determined by using differential scanning calorimetry. The liquid sample holder described above was filed with LTTM ionic liquid (Low Transition Temperature Mixtures choline chloride and ethylene glycol). The sample holder filed with the ionic liquid was then left on the cryo-stage and the sample was kept under nitrogen flow. Under N2 flow, the temperature of the stage was brought down to negative 20 degrees C. at the rate of 10 degrees C./min. The sample temperature was then continuously dropped down to negative 100 degrees C. at the rate of 5 degrees C./min under N2 flow with water concentration of 200 ppm while a microscope at magnification of 10× equipped with a camera was monitoring ice formation on the surface of the liquid.

As shown in FIG. 5, no ice was formed on the ionic liquid down to negative 100 degrees. The results observed above indicated that a hydrophilic substance performs better for ice prevention.

Referring now to FIGS. 6A-6H, a liquid propylene impregnated aluminum surface, a liquid Krytox™ impregnated aluminum surface, and a smooth control aluminum surface (with no liquid or surface treatment) were studied under various cooling and heating stages with flow containing water.

Three 5.072 cm×7.567 cm×0.31 cm aluminum plates, referred to as plate A, B, and C as shown in FIGS. 6A-6H, were used. Plate A, the control plate, was cleaned using acetone, then ethanol, and finally heptane before being dried with N2. The surfaces of plates B and C were roughen using A475 grit sandpaper. These two plates were then cleaned using acetone, then ethanol, and finally heptane before they were dried with N2 and put in a plasma cleaner for 5 minutes. Plasma radiation cleans the surface from any hydrocarbon residue and increases the surface energy through surface oxidation.

Plate B was then left in a solution of octadecyltrichlorosilane (OTS) in toluene for 120 minutes before it was taken out and gently dried with N2 gas and left in a vacuum oven at 120 degrees C. for 60 minutes. This procedure causes OTS to adsorb onto the surface, generating a low surface energy substrate, necessary for impregnation of the plate B with Krytox. An adequate amount of Krytox™ was then poured onto plate B to generate a liquid Krytox™ impregnated surface. An adequate amount of propylene glycol was put on plasma treated plate C to generate a liquid propylene glycol impregnated surface.

Figure 6A:
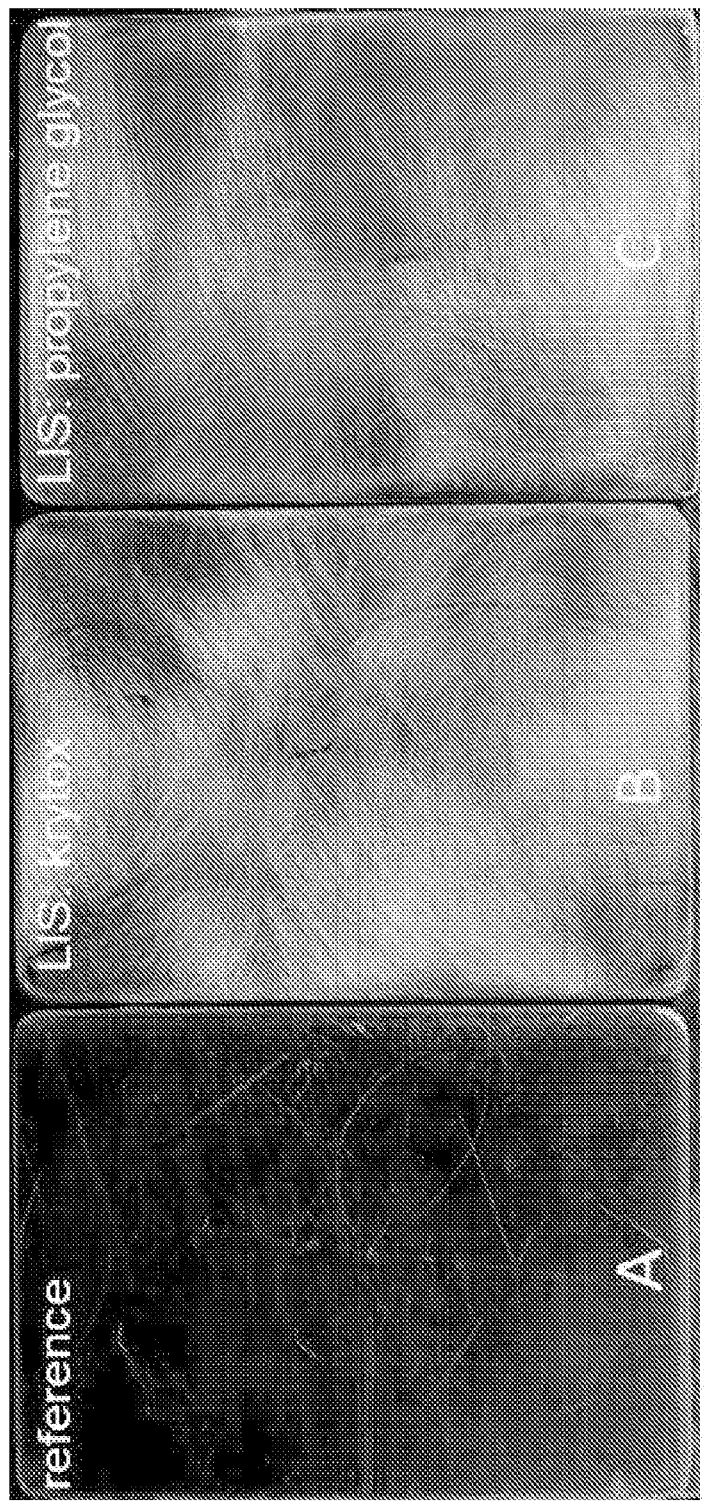
Figure 6B:
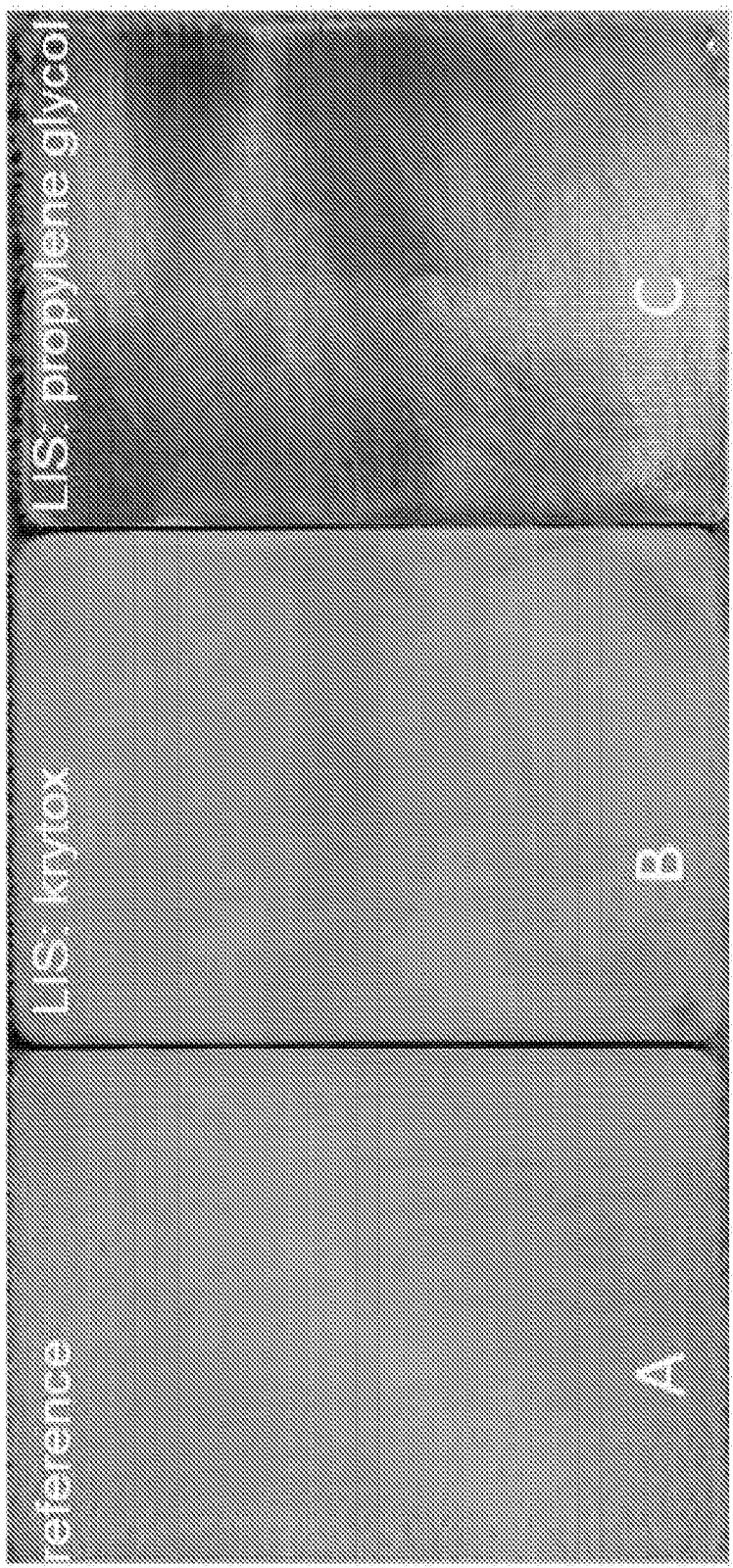
Figure 6C:
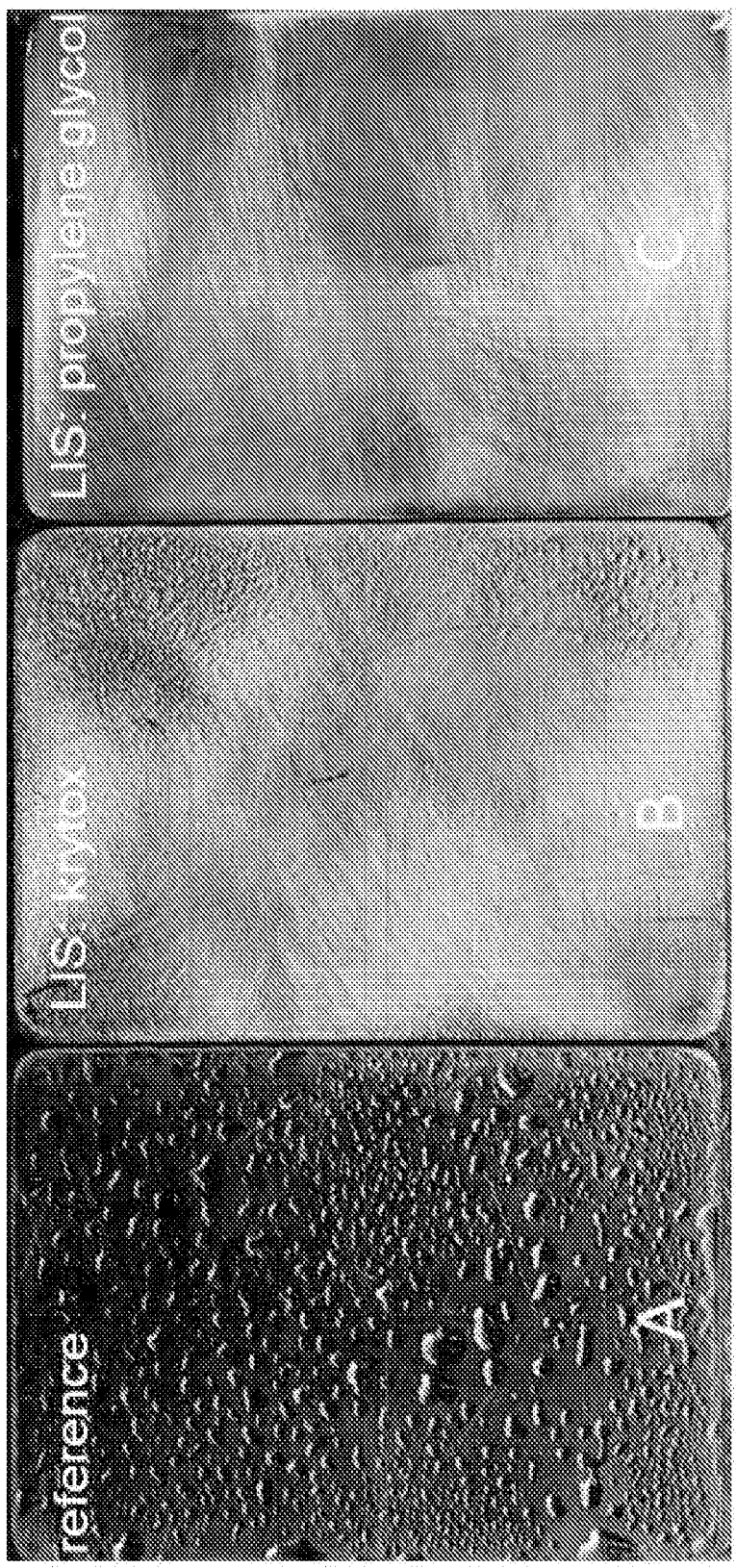
Figure 6D:
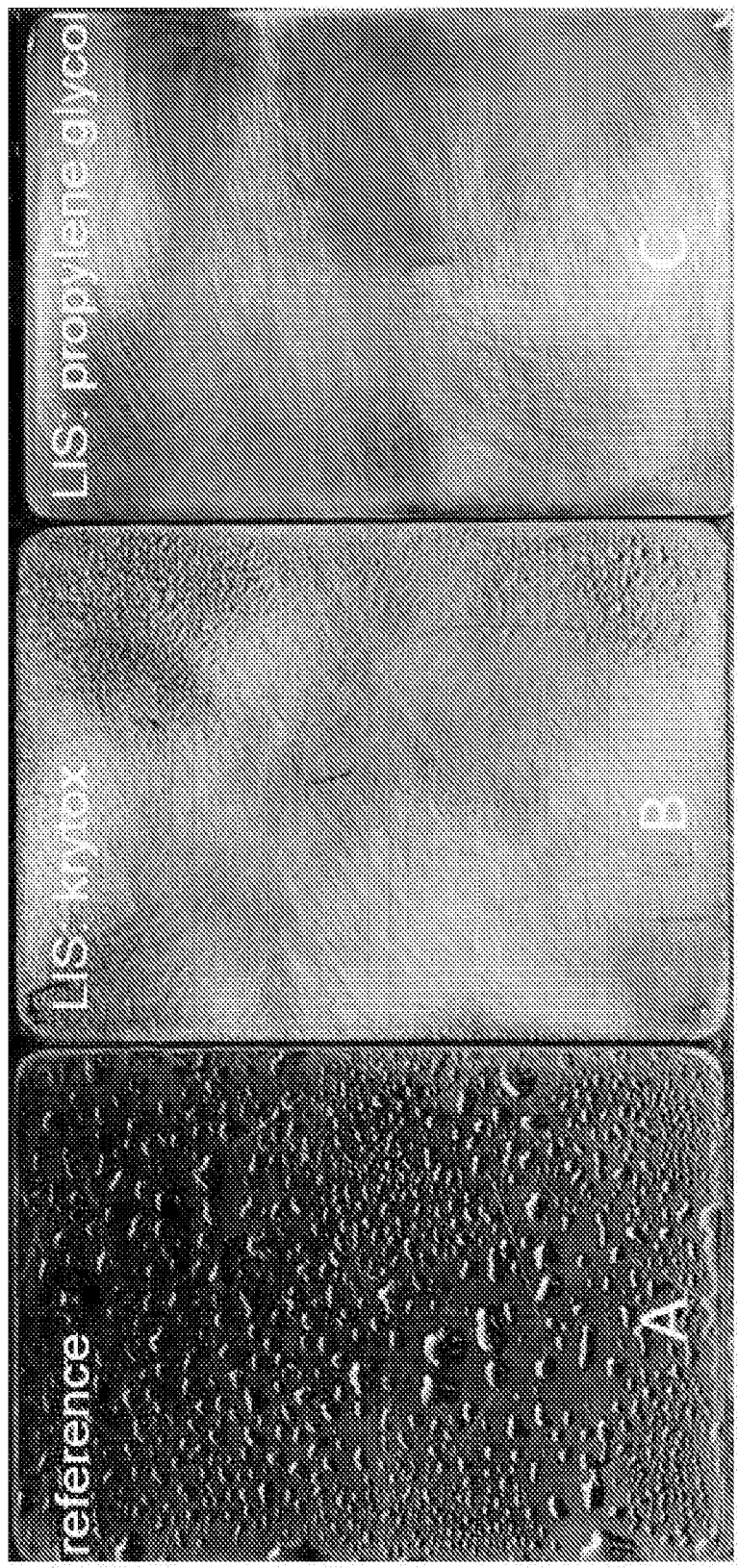
Figure 6E:
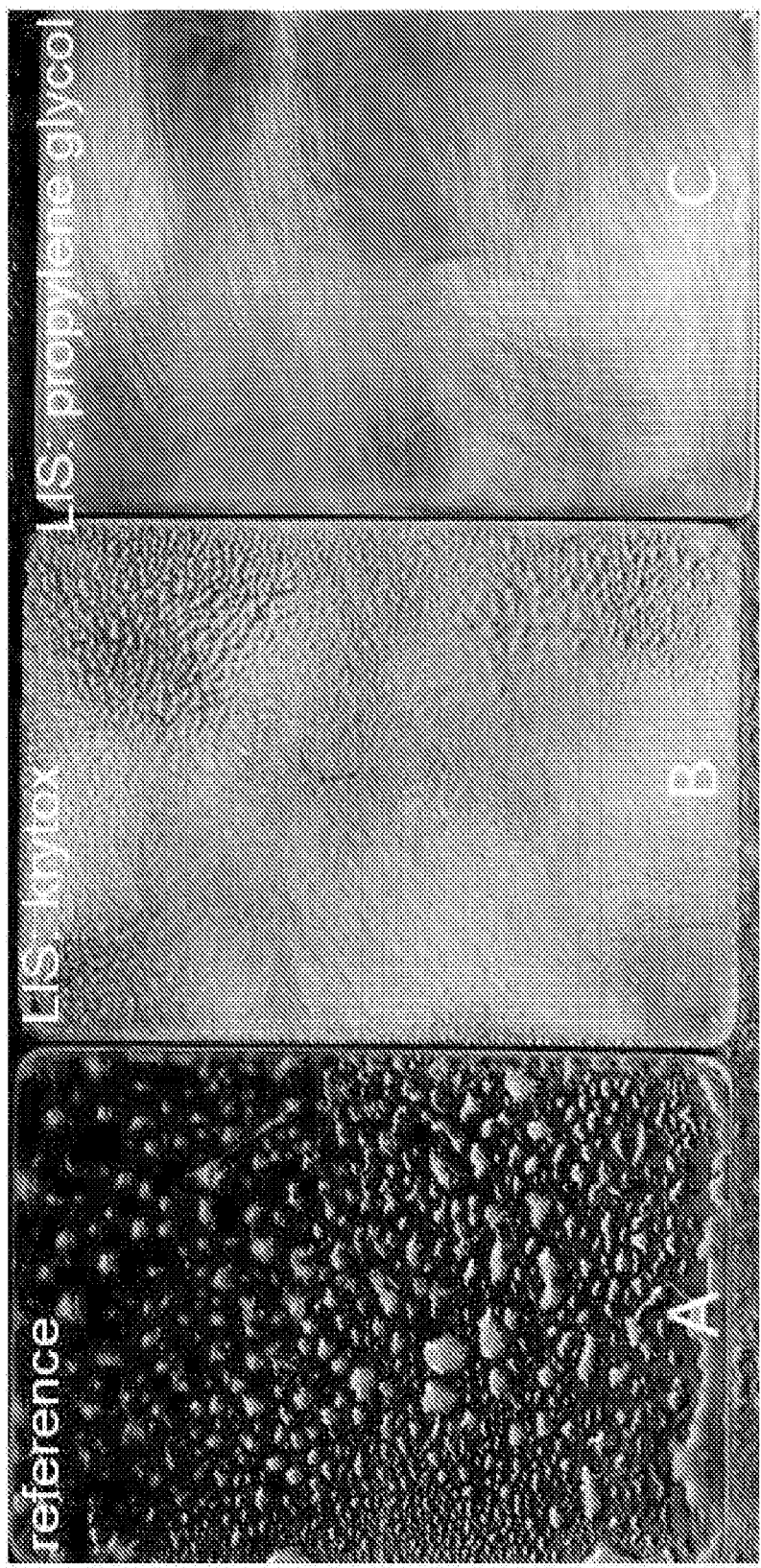
Figure 6F:
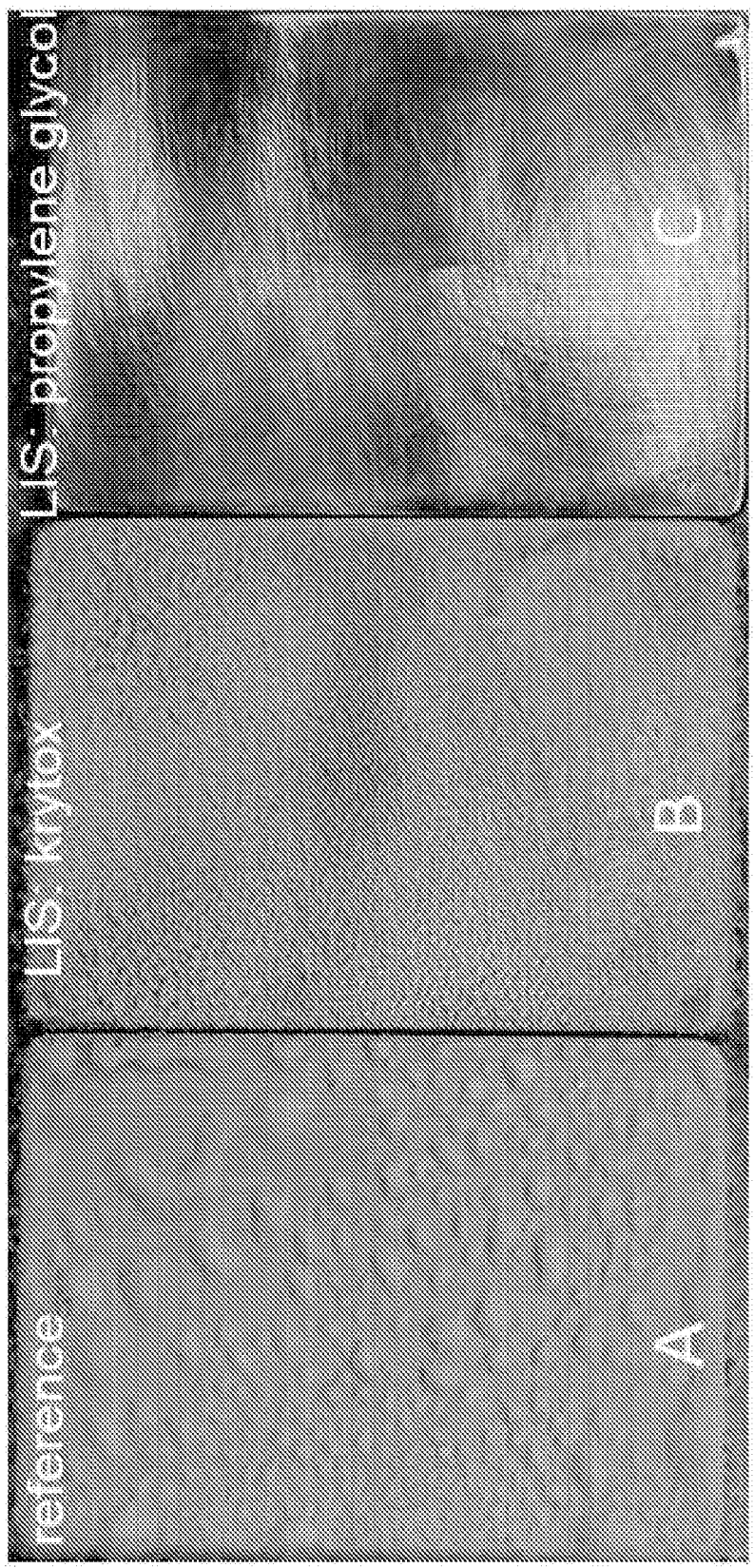
Figure 6G:
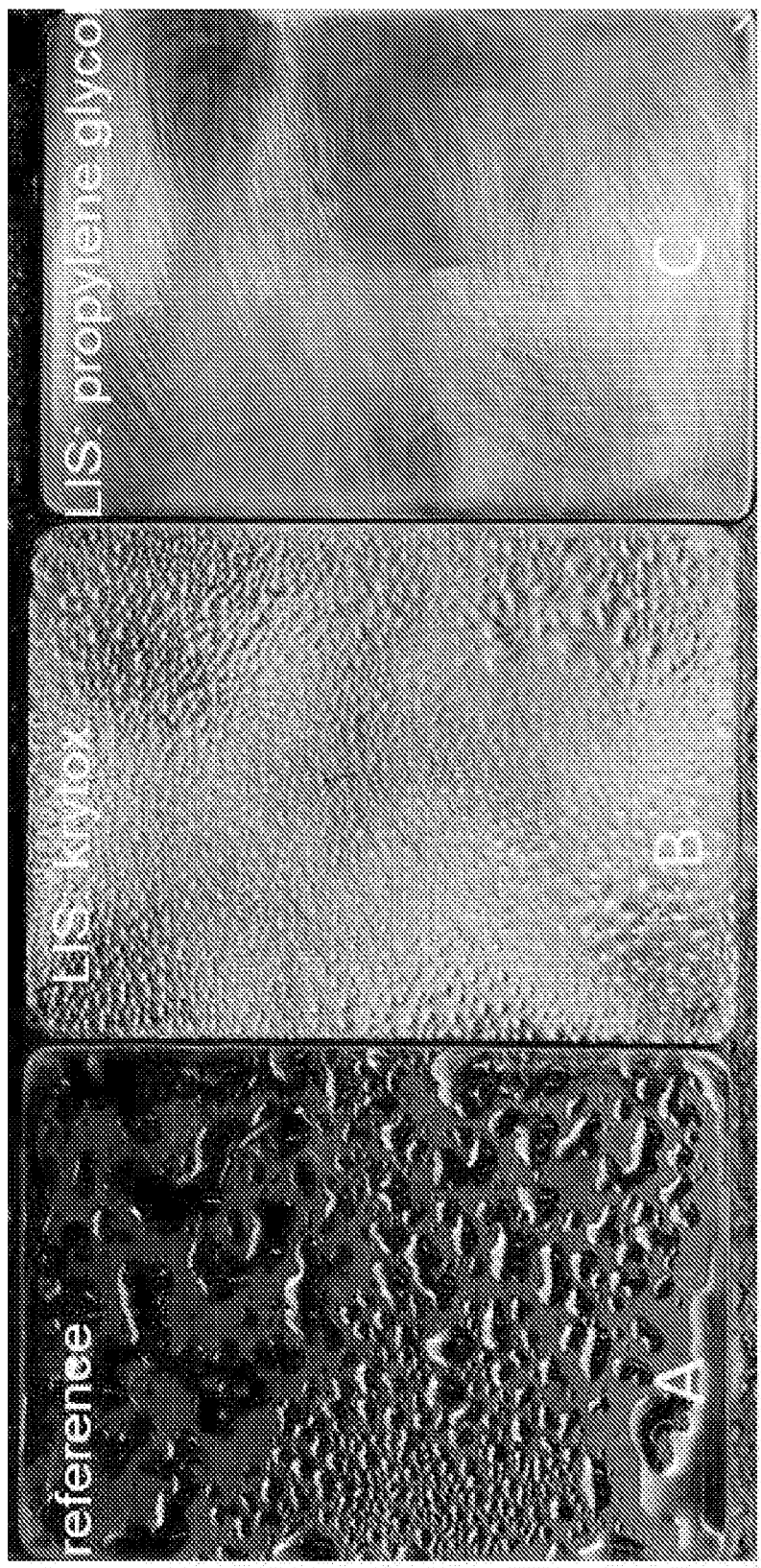

The three plates, A, B, and C were put in a tray filled with dry ice in a 23 degree C. laboratory with a relative humidity of 50%. The ice formation on the three plates was recorded with a camera. After observation of ice formation (e.g., as shown in FIGS. 6B, D, F, and H) the plates were gently lifted from the dry ice tray and brought up to laboratory room temperature, e.g., as shown in FIGS. 6C, E, and G. The cooling cycle and heating cycle were repeated four and three times, respectively.

Figure 6H:
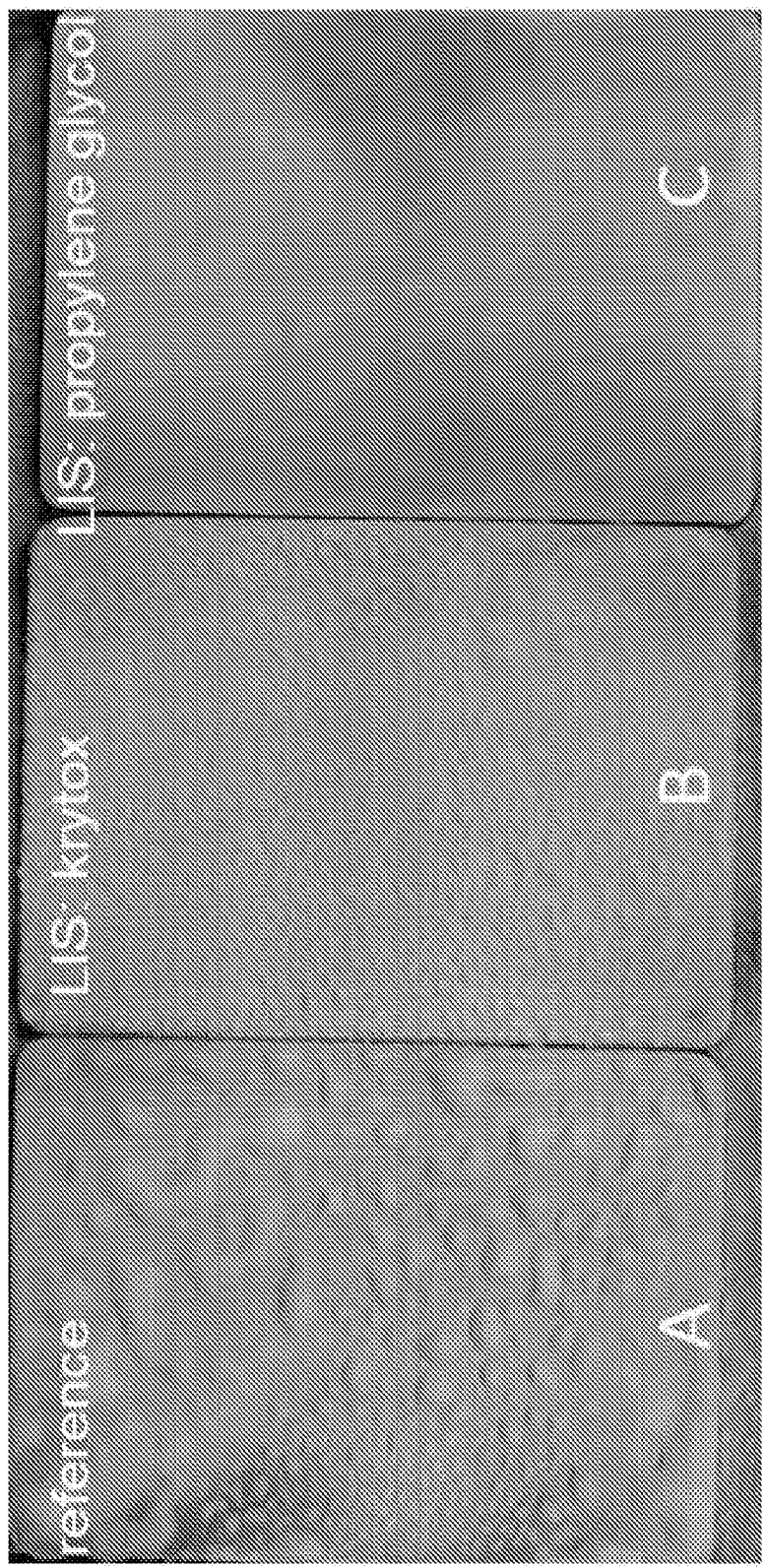

FIGS. 6H-6H display the images of plates A, B, and C before and during the cooling and heating cycles. It clearly shows that after the first cooling cycle both the reference plate (plate A) and the liquid Krytox™ impregnated surface (plate B) were covered with ice. No ice was formed on the liquid propylene glycol impregnated plate (plate C). Water droplets were visible on plate A and B during the heating cycle. No water droplets are observed on plate C. This trend was observed for three cycles. Ice was observed on plate C during the fourth cooling cycle.

The results indicate that the propylene glycol liquid impregnated surface shows a superior anti-icing behavior over the reference and the hydrophobic liquid approach. As shown, the propylene glycol does not exhibit icing until it is sufficient saturated with water.

Figure 7:
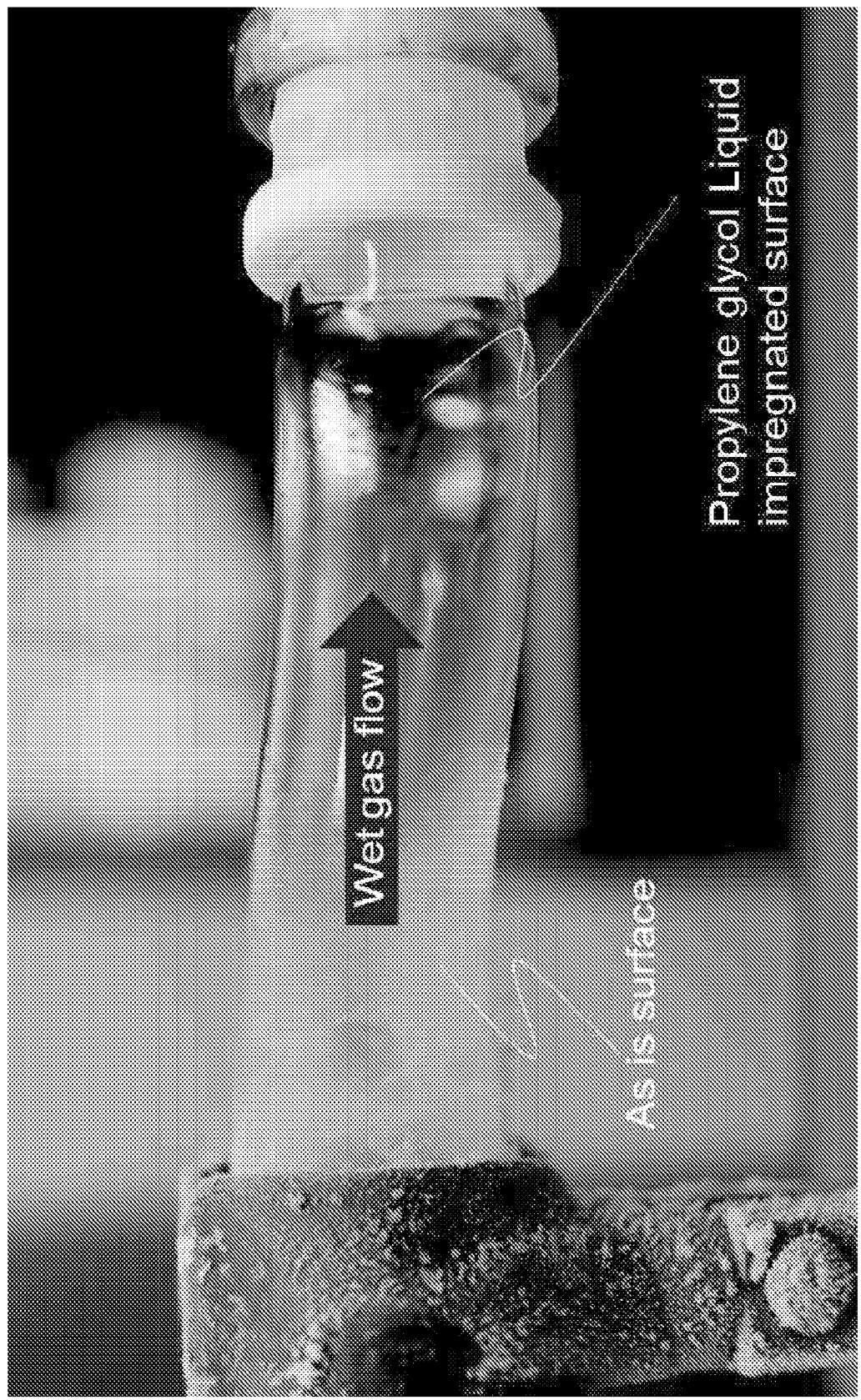
FIG. 7 shows an image of a flow tube partially impregnated with hydrophilic liquid (a right portion of the tube) and an untreated portion performing under a flow condition.

Referring to FIG. 7, the effect of using propylene glycol was further studied in a flow tube. An external and internal segment of a glass (Pyrex™ low-thermal-expansion borosilicate glass) tube was roughened, cleaned, and impregnated with propylene glycol liquid to produce an anti-icing surface. The tube was then immersed in dry ice while wet nitrogen gas was flowing through the tube. FIG. 7 shows ice formation on the segment of the tube which was not a propylene glycol liquid impregnated surface. As can be seen in FIG. 7, the propylene glycol liquid impregnated surfaces segment of the tube resisted against any ice formation.

As disclosed above, the water-miscible liquid impregnated surface resists against ice formation by dissolving water and ice within the bulk liquid. When the liquid is saturated with water it may benefit from regeneration for a continuous operation. Embodiments can include lines that flow the saturated liquid (e.g., using a pressure supplied by a pump, not shown) to a regeneration unit where the water can be separated from the liquid (e.g., by heating the mixed liquid) and the regenerated liquid can be sent back to, for example, liquid impregnated surface which can form a heat exchanger tube. The surface texture and/or roughness and/or chemical functionality of the surface can allow spreading of the liquid onto the surface through the wicking effect, for example. Accordingly, embodiments can allow regeneration and continuous use of a water miscible hydrophilic liquid, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

Exemplary Embodiments for PCT and EP Claims

1. A frozen material prevention system for preventing a freezable material in a fluid flow from freezing and accumulating frozen material in a flow path, comprising: a surface configured to interact with a freezable-material-miscible (FMM) liquid to retain the FMM liquid to the surface.

2. The system of clause 1, further comprising the FMM liquid, wherein the FMM liquid is configured to absorb the freezable material to prevent freezing and accumulation of frozen material on the surface.

3. The system of any of the preceding clauses, wherein the freezable material is or includes water, wherein the frozen material is or includes water ice.

4. The system of any of the preceding clauses, wherein the FMM liquid is or includes propylene glycol.

5. The system of any of the preceding clauses, wherein the surface forms at least a portion of a flow structure that defines the flow path.

6. The system of clause 5, wherein the surface includes a tubular shape.

7. The system of any of the preceding clauses, further comprising a regeneration system connected to surface, the regeneration system configured to at least partially remove the freezable material from the FMM liquid to at least partially regenerate the FMM liquid on the surface.

8. The system of clause 7, wherein the regeneration system includes a regeneration unit in fluid communication with the surface by an inlet line connected to an inlet at the surface and an outlet line connected to an outlet at the surface to circulate the FMM liquid.

9. The system of clause 8, wherein the outlet is downstream from the inlet relative to a direction of the fluid flow in the flow path.

10. The system of clauses 7 or 8, wherein the regeneration unit is a water removal system configured to remove water from the FMM liquid.

11. A liquid impregnated surface, comprising:
a surface configured to interact with a freezable-material-miscible (FMM) liquid to retain the FMM liquid to the surface; and
the FMM liquid, wherein the FMM liquid is configured to absorb a freezable material to prevent freezing and accumulation of frozen material on the surface.

12. The liquid impregnated surface of clause 11, wherein the freezable material is or includes water, wherein the frozen material is or includes water ice.

13. The liquid impregnated surface of clauses 11 or 12, wherein the FMM liquid is or includes propylene glycol.

14. The liquid impregnated surface of any of clauses 11-13, wherein the surface forms a flow structure defining a flow path.

15. A method for preventing a freezable material in a fluid flow from freezing and accumulating frozen material in a flow path, comprising: absorbing a freezable material from a fluid flow using a freezable-material-miscible (FMM)

liquid disposed on a surface defining a flow structure, thereby forming mixed FMM liquid having at least some freezable material therein; flowing at least a portion of the mixed FMM liquid from the surface to a regeneration unit; removing at least a portion of the freezable material from the mixed FMM liquid to form at least partially regenerated FMM liquid; and returning the at least partially regenerated FMM liquid to the surface.

EQUIVALENTS

Those skilled in the art will recognize, or be able to ascertain using no more than routine experimentation, many equivalents to the specific embodiments and methods described herein. Such equivalents are intended to be encompassed by the scope of the following claims.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A frozen material prevention system for preventing a freezable material in a fluid flow from freezing and accumulating frozen material in a flow path, comprising:
    a surface configured to interact with a freezable-material-miscible (FMM) liquid to retain the FMM liquid to the surface; and
    a regeneration system connected to the surface, wherein regeneration system is configured to at least partially remove the freezable material from the FMM liquid to at least partially regenerate the FMM liquid on the surface.

2. The system of claim 1, further comprising the FMM liquid, wherein the FMM liquid is configured to absorb the freezable material to prevent freezing and accumulation of frozen material on the surface.

3. The system of claim 1, wherein the freezable material is or includes water, wherein the frozen material is or includes water ice.

4. The system of claim 1, wherein the FMM liquid is or includes propylene glycol.

5. The system of claim 1, wherein the surface forms at least a portion of a flow structure that defines the flow path.

6. The system of claim 5, wherein the surface includes a tubular shape.

7. The system of claim 1, wherein the regeneration system includes a regeneration unit in fluid communication with the surface by an inlet line connected to an inlet at the surface and an outlet line connected to an outlet at the surface to circulate the FMM liquid.

8. The system of claim 1, wherein the outlet is downstream from the inlet relative to a direction of the fluid flow in the flow path.

9. The system of claim 1, wherein the regeneration unit is a water removal system configured to remove water from the FMM liquid.

* * * * *